United States Patent [19]

Nishikawa et al.

[11] Patent Number: 4,747,146
[45] Date of Patent: May 24, 1988

[54] SYSTEM FOR DETECTING DIFFERENCE BETWEEN IMAGE ON PRIMARY SHEET AND IMAGE ON SECONDARY SHEET

[75] Inventors: Nobuyuki Nishikawa, Fujimi; Yoshimitsu Mori, Kitamoto; Joji Honda, Tokyo; Kiyotaka Hara, Ohmiya, all of Japan

[73] Assignee: Kyodo Printing Co., Ltd., Tokyo, Japan

[21] Appl. No.: 731,103

[22] Filed: May 6, 1985

[30] Foreign Application Priority Data

May 9, 1984 [JP] Japan ................... 59-092292

[51] Int. Cl.$^4$ ............................... G06H 9/00
[52] U.S. Cl. ....................... 382/1; 340/715; 382/8
[58] Field of Search ............ 382/1, 8, 30, 33, 34; 358/106, 101; 364/521; 356/443, 425, 237, 390; 340/715, 709; 250/562

[56] References Cited

U.S. PATENT DOCUMENTS

| 4,495,491 | 1/1985 | Postl | 340/709 |
| 4,521,774 | 6/1985 | Murphy | 340/728 |
| 4,578,770 | 3/1986 | Mitani | 250/562 |
| 4,626,101 | 12/1986 | Ogawa et al. | 356/237 |
| 4,641,353 | 2/1987 | Kobayashi | 358/101 |
| 4,646,252 | 2/1987 | Terashita | 382/1 |
| 4,651,341 | 3/1987 | Nakashima et al. | 382/34 |

FOREIGN PATENT DOCUMENTS 5,891,451  5/1983  Japan ..................... G03F/3/10

Primary Examiner—Leo H. Boudreau
Assistant Examiner—Joseph Mancuso
Attorney, Agent, or Firm—Kane, Dalsimer, Sullivan, Kurucz, Levy, Eisele and Richard

[57] ABSTRACT

There is disclosed a system for detecting a difference between an image on a primary sheet and an image on a secondary sheet. A microprocessor unit determines whether corresponding ones of first and second image elements representative respectively of the images on the primary and secondary films differ in optical density from each other below a predetermined level. The two corresponding first and second image elements different above the predetermined level are emphasized in optical density difference and alternately displayed on a display screen at a short time interval, so that the dot of the display screen which alternately display these image elements is caused to flicker.

6 Claims, 2 Drawing Sheets

SYSTEM FOR DETECTING DIFFERENCE BETWEEN IMAGE ON PRIMARY SHEET AND IMAGE ON SECONDARY SHEET

BACKGROUND OF THE INVENTION

1. Field of the Invention

This invention relates to a system for inspecting an image on a sheet such as a printing film and more particularly detecting a difference between an image on an original or primary printing film and an image on a corrected or secondary printing film to determine the omission of necessary image information from the secondary printing film and the addition of unnecessary information, such as that represented by dirt, to the secondary printing film.

2. Prior Art

In the production of printing films or the like, it is necessary to detect any defect contained on the secondary printing film produced based on the primary printing film. Such detection has heretofore been carried out by displaying the image of the secondary film on a display screen and checking the film image displayed on the screen with the eye.

In the inspection of the secondary film, it is necessary to check not only the corrected portions of the image which have been made but also any possible defect such as the omission of a character or the like. Therefore, attention is drawn to such corrected portions, so that any error in those portions may be easily found, but it is quite possible that the operator may overlook some defects on the remainder of the image such as the omission of a character.

SUMMARY OF THE INVENTION

It is therefore an object of this invention to provide a system for detecting a difference between an image on a primary sheet such as a printing film and an image on a secondary sheet by which system any defect of the image of the secondary sheet can be easily detected.

According to the present invention, there is provided a system for detecting a difference between an image on a primary sheet and an image on a secondary sheet, the image on the secondary sheet being reproduced from the image on the primary sheet, the system comprising:

(a) data producing means for producing a plurality of first image data representative respectively of a predetermined number of first image elements constituting the image on the primary sheet and a plurality of second image data representative respectively of the predetermined number of second image elements constituting the image on the secondary sheet, and the value of each of the first and second image data specifying an optical density of the respective first and second image elements;

(b) memory means for storing the first and second image data;

(c) a microprocessor unit programmed to compare each two corresponding first and second image data with each other to determine whether a difference in value between the two corresponding first and second image data is above a predetermined level, the microprocessor unit being programmed to write into the memory means two new image data, corresponding respectively to the two corresponding first and second image data and specifying an emphasized value difference therebetween;

(d) display means including a display screen;

(e) timer means for producing a timer signal; and (f) reading means for reading from the memory means the new first image data and the first image data other than that corresponding to the first new image data, and the new second image data and the second image data other than the new second image data, and the reading being responsive to the timer signal to alternately reading these first image data and these second image data at a predetermined time interval, so that a first image represented by these first image data and a second image represented by these second image data are alternately displayed on the screen of the display means at the time interval.

DESCRIPTION OF THE PREFERRED EMBODIMENT OF THE INVENTION

Figure 1:
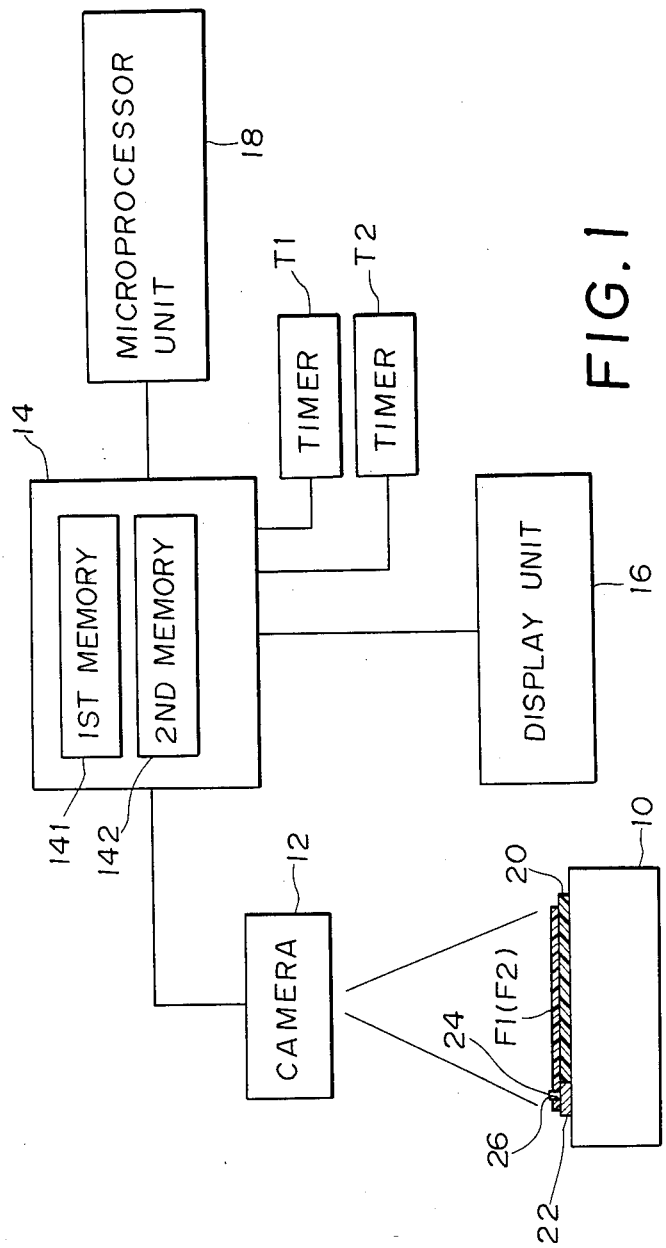
FIG. 1 is a block diagram of a detecting system provided in accordance with the present invention.

The invention will now be described with reference to the drawings.

A system for detecting a secondary printing film F2 comprises a table 10, a television camera 12, a memory unit 14, a display unit 16, and a microprocessor unit 18 including a central processing unit (CPU). The display unit 16 is a monochrome CRT. The table 10 here comprises a light table on which a primary printing film F1 and the secondary printing film F2 are adapted to be placed. An image on the secondary film F2 for making a printing plate is reproduced from an image on the primary film F1 and contains some corrections. A film supporting plate 20 of a transparent plastics material is adapted to be placed on the light table 10. The film supporting plate 20 has a registration member 22 of a rectangular shepe embedded in one end of the supporting plate 20, the top surface of the supporting plate 20 being flush with the top surface of the registration member 22. The registration member 22 has a row of registration pins 24 formed on the top surface thereof. The registration member 22 is made of metal and serves as a weight, and therefore the film supporting plate 20 is prevented from being inadvertently displaced with respect to the light table 10 when setting each film thereon. Each of the primary and secondary films F1 and F2 of the same size has a registration perforation 26 at one end thereof, and the registration pins 24 are fitted in the registration perforation 26 for holding each of the primary and secondary films F1 and F2 in position with respect to the film supporting plate 20 when it is set thereon. By virtue of the provision of the film supporting plate 20, the primary and secondary films F1 and F2 can be set at the same position on it. The position of the film supporting plate 20 with respect to the light table 10 can be easily adjusted since the former is merely placed on the latter. Therefore, films of various sizes can be suitably set on the film supporting plate 20.

The light table 10 has an upright post on which the television camera 12 is mounted. The television camera 12 has a manually-operative zoom lens which is directed toward the film supporting plate 20. The television camera 12 is directed to the film on the film supporting plate 20 and delivers a video signal representative of the image on the film to a first controller of the memory unit 14. The television camera 12 contains a vidicon of the separate mesh type (not shown), so that the television camera 12 delivers the video signal representative of each of 256×256 image elements constituting the image of the film. The television camera 12 including a timing signal generator for generating a horizontal and vertical synchronization signal to the first controller of the memory unit 14.

The first controller of the memory unit 14 comprises analog-to-digital converter means and data writing means. The video signal outputted from the television camera 12 is converted into digital data by the analog-to-digital converter means and is written by the data writing means into the memory unit 14. More specifically, the memory unit 14 comprises a first memory 141 for storing the data representative of the image of the primary film F1 and a second memory 142 for storing the image of the secondary film F2. The data representative of the image elements of the image of each film are sequentially written respectively into addresses of a respective one of the memories 141 and 142 in accordance with the horizontal and vertical synchronization signals.

The memory unit 14 further comprises a second controller including digital-to-analog converter means, data reading means, and a timing signal generator for generating a synchronization signal. The data are sequentially read by the data reading means from the addresses of each of the first and second memories 141 and 142 and are converted into video signals by the digital-to-analog converter of the second controller. Each of these video signals is combined with the synchronization signal outputted from the timing signal generator of the second controller to form a composite signal. These composite signals are fed to the display unit 16 to display a film image as described later. The reading means is responsive to timer signals outputted from first and second timers T1 and T2 to alternately read the data from the first and second memories 141 and 142.

Figure 2:
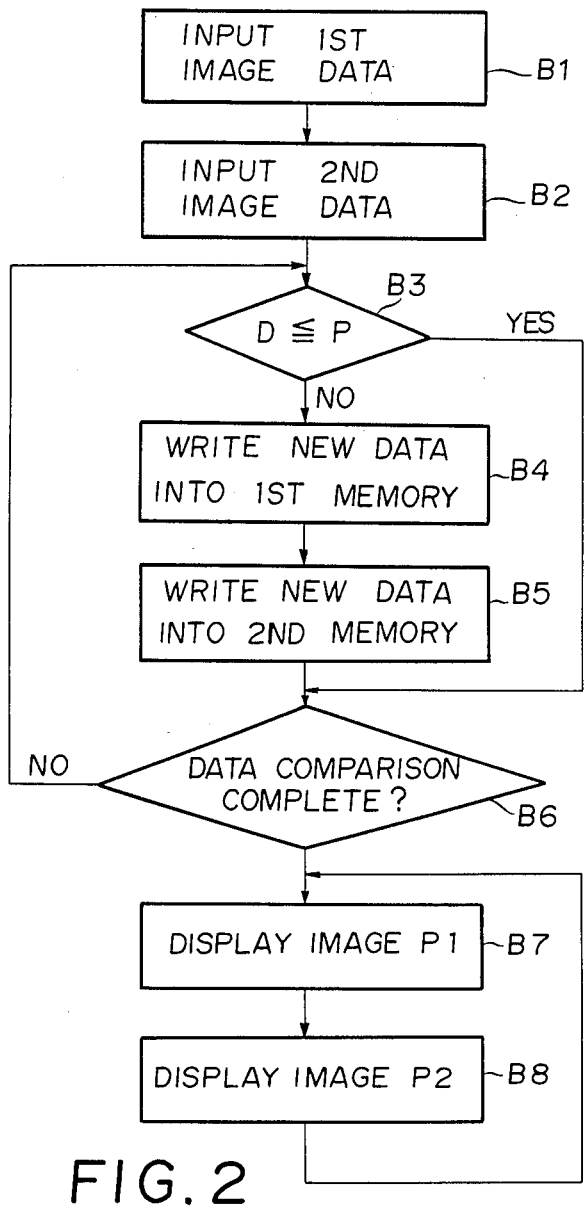
FIG. 2 is a flow chart of a program for carrying out a detecting operation.

FIG. 2 shows a flow chart of a program for effecting the film inspection. First, the primary film F1 is placed on the film supporting plate 20 on the light table 10. Then, in Block B1, the first image data representative of the first image elements of the image of the primary film F1 are written into the respective addresses of the first memory 141 through the television camera 12. The value of each first image data specified the optical density of a corresponding one of the first image elements. Then, the primary film F1 is removed from the film supporting plate 20, and the secondary film F2 is placed on the film supporting plate 20. As described above, since the film supporting plate 20 has the registration pins 24, the primary and secondary films F1 and F2 are set at the same position.

Then, in Block B2, the second image data representative of the second image elements of the image of the secondary film F2 are written into the respective addresses of the secondary memory 142 according to the same procedure described above in Block B1.

Then, in Block B3, the microprocessor unit 18 compares each of the first image elements with a corresponding one of the second image elements with respect to the optical density to determine whether these two corresponding first and second image elements coincide with each other in optical density. More specifically, it is determined whether a difference D in optical density between these two corresponding first and second image elements is below a predetermined level P. If the difference D is below or equal to the predetermined level, the processing proceeds to Block B6 in which the microprocessor unit 18 checks whether all of the first image elements have been compared with the corresponding second image elements, respectively. If the result is "NO", the processing returns to Block B3. And, if the result is "YES", the processing proceeds to Block B7 as later described. The predetermined level is so set that acceptable registration errors and noises can be disregarded.

In Block B3, if the difference D in optical density between the two corresponding first and second image elements is not below the predetermined level P, the processing proceeds to the next Block B4.

The microprocessor unit 18 includes an associated memory (not shown) for storing a program by which in Block B4, the microprocessor unit 18 accesses the first memory 141 to write data, representative of a higher optical density than that of the first image element different in optical density from the corresponding second image element beyond the predetermined level P, into that address of the first memory 141 in which the data representatative of the first image element has written.

In Block B5, in accordance with the above-mentioned program, the microprocessor unit 18 accesses the second memory 142 to write data, representative of a lower optical density than that of the second image element different in optical density from the corresponding first image element beyond the predetermined level P, into that address of the second memory 142 into which the data representative of the second image element has been written. Thus, the difference in optical density between the corresponding first and second image elements is made greater or emphasized. For example, the optical density is in the range of between "0" (white representing a highlight) and "10" (black representing a shadow). If the corresponding first and second image elements are represented by an optical density of "6" and an optical density of "2", respectively, the data representative of an optical density of "10" and the data representative of an opical density of "0" are written into the above-mentioned addresses of the first and second memories 141 and 142, respectively. Thus, the difference in optical density between the corresponding first and second image elements is emphasized to the maximum.

Then, the processing proceeds to Block B6 in which the microprocessor unit 18 checks whether all of the first image elements have been compared with the corresponding second image elements, respectively, as described above. Finally, this comparison is completed, so that the processing proceeds to Block B7. In this Block, the image data are sequentially read from the first memory 141, and are converted into video signals by the digital-to-analog converter of the second controller, and are combined with the synchronization signals outputted from the timing signal generator of the second controller to form the composite signals which are fed to the display unit 16, so that an image P1, which is similar to the image of the primary film F1 except for the emphasized image elements, is displayed on the screen of the display unit 16.

Then, in Block B8, the image data are sequentially read from the second memory 142, and the composite signals are produced in the manner as described above for Block B7 and are fed to the display unit 16, so that an image P2, which is similar to the image of the secondary film F2 except for the emphasized image elements, is displayed on the screen of the display unit 16.

The image P1 and the image P2 are alternately displayed at a predetermined short time interval, so that that dot of the display screen which alternately displays each corresponding image elements emphasized in optical density is caused to flicker. Therefore, the operator can easily locate any defect on the image of the secondary film F2. The time period of display of the image P1 on the screen is determined by a timer T1. Similarly, the time period of display of the image P2 on the screen is determined by a timer T2. The reading means of the second controller is responsive to a timer signal from each of the timers T1 and T2 to read the data from a respective one of the first and second memories 141 and 142. Each time period is usually set to 0.5 seconds.

According to a modified form of the invention, if the difference in optical density between two corresponding first and second image elements is determined to be below the predetermined level in Block B3, data representative of an optical density equal to that of the second image element is written into that address of the first memory 141 into which the data representative of the first image element has been written before the processing proceeds to Block B6.

As described above, according to the present invention, any defect on the secondary film can be easily be detected without fail since the dot of the screen indicating this defect flickers. This detection method can be carried out at relatively low costs by utilizing a commercially-available personal computer.

While the image detecting system according to the invention has been specifically shown and described herein, the invention itself is not to be restricted to the exact showing of the drawings or the description thereof. For example, although the registration of the primary and secondary films with respect to the light table 10 is effected by the registration pins 24 on the film supporting plate 20, the use of the film supporting plate 20 may be omitted in which case the image on the primary film F1 is reversed and stored in the memory unit 14 through the television camera 12, and this reversed image and the image on the secondary film F2 inputted into the television camera 12 are alternately displayed on the screen of the display unit 16 so as to adjust the position of the secondary film F2 with respect to the light table 10.

Further, although the new data representative of the emphasized optical densities with respect to the two corresponding first and second image elements are written respectively into the addresses of the first and second memories 141 and 142 in which the data representative of the first and second image elements have been stored, respectively, these new data may be written into other areas of the memory unit 14.

Further, although the alternate display of the images P1 and P2 on the display screen is carried out by the use of the timers T1 and T2, this may be effected by a manually-operative switching means.

What is claimed is:

1. A system for detecting a difference between an image on a primary sheet and an image on a secondary sheet, the image on the secondary sheet being reproduced from the image on the primary sheet, said system comprising:
    (a) data producing means for producing a plurality of first image data representative respectively of a predetermined number of first image elements constituting the image on the primary sheet and a plurality of second image data representative respectively of the predetermined number of second image elements constituting the image on the secondary sheet, the value of each of said first and second image data specifying an optical density of the respective first and second image elements;
    (b) memory means for storing said first and second image data;
    (c) a microprocessor unit programmed to compare each two corresponding first and second image data with each other to determine whether a difference in value between said two corresponding first and second image data is above a predetermined level, said microprocessor unit being programmed to write into said memory means two new image data, corresponding respectively to said two corresponding first and second image data and specifying an emphasized value difference therebetween;
    (d) display means including a display screen;
    (e) timer means for producing a timer signal; and
    (f) reading means for reading from said memory means said new first image data and said first image data other than that corresponding to said first new image data, and said new second image and said second image data other than that corresponding to said new second image data, and said reading means being responsive to said timer signal to alternately reading these first image data and these second image data at a predetermined time interval, so that a first image represented by these first image data and a second image represented by these second image data are alternately displayed on the screen of said display means at said time interval.

2. A system according to claim 1, in which when it is determined by said microprocessor unit that a difference in value between any two corresponding first and second image data is above the predetermined level, said microprocessor unit accesses said memory means to write a new image data equal in value to said corresponding second image data into said memory means, said new image data and said new first image data repreesentative of the emphasized value difference being read from said memory means by said reading means to display said first image on said display screen.

3. A system according to claim 1, in which said data producing means comprises a television camera for inputting the images on said primary and secondary sheets thereto.

4. A system according to claim 3, in which said television camera comprising a zoom lens.

5. A system according to claim 1, in which said display unit is a monochrome CRT.

6. A system according to claim 1, in which said emphasized value between said two new image data is of maximum optical density resolvable on said display means.

* * * * *